(12) United States Patent
Kramer (10) Patent No.: US 8,356,333 B2
(45) Date of Patent: Jan. 15, 2013

(54) SYSTEM AND METHOD FOR VERIFYING NETWORKED SITES

(75) Inventor: Glenn A Kramer, San Francisco, CA (US)

(73) Assignee: Bespoke Innovations Sarl, Bellevue (CH)

( * ) Notice: Subject to any disclaimer, the term of this patent is extended or adjusted under 35 U.S.C. 154(b) by 1309 days.

(21) Appl. No.: 11/850,805

(22) Filed: Sep. 6, 2007

(65) Prior Publication Data

US 2010/0031022 A1 Feb. 4, 2010

Related U.S. Application Data

(60) Provisional application No. 60/874,267, filed on Dec. 12, 2006.

(51) Int. Cl.
*G06F 17/00* (2006.01)
(52) U.S. Cl. .................................. 726/2; 726/4
(58) Field of Classification Search .............. 726/2, 4
See application file for complete search history.

(56) References Cited

U.S. PATENT DOCUMENTS

| | | | | |
|---|---|---|---|---|
| 6,760,752 B1* | 7/2004 | Liu et al. | | 709/206 |
| 7,100,049 B2 | 8/2006 | Gasparini et al. | | |
| 7,673,001 B1* | 3/2010 | Battle et al. | | 709/206 |
| 7,694,335 B1* | 4/2010 | Turner et al. | | 726/14 |
| 2002/0038286 A1* | 3/2002 | Koren et al. | | 705/40 |
| 2004/0030784 A1 | 2/2004 | Abdulhayoglu | | |
| 2004/0078564 A1 | 4/2004 | Abdulhayoglu | | |
| 2004/0243802 A1* | 12/2004 | Jorba | | 713/168 |
| 2005/0120369 A1* | 6/2005 | Matz | | 725/40 |
| 2005/0129286 A1* | 6/2005 | Hekimian | | 382/117 |
| 2005/0177750 A1* | 8/2005 | Gasparini et al. | | 713/201 |
| 2006/0112431 A1* | 5/2006 | Finn et al. | | 726/22 |
| 2006/0129627 A1* | 6/2006 | Phillips et al. | | 709/200 |
| 2006/0200532 A1* | 9/2006 | Skladman et al. | | 709/206 |
| 2006/0200855 A1 | 9/2006 | Willis | | |
| 2006/0206717 A1* | 9/2006 | Holt et al. | | 713/182 |
| 2006/0258427 A1* | 11/2006 | Rowe et al. | | 463/16 |
| 2007/0067620 A1* | 3/2007 | Jevans | | 713/156 |
| 2007/0083919 A1* | 4/2007 | Heffez | | 726/5 |
| 2007/0240206 A1* | 10/2007 | Wu et al. | | 726/8 |
| 2007/0288502 A1* | 12/2007 | Silverthorne | | 707/102 |
| 2008/0022089 A1* | 1/2008 | Leedom | | 713/156 |
| 2008/0028444 A1* | 1/2008 | Loesch et al. | | 726/4 |
| 2008/0028475 A1* | 1/2008 | Kalman | | 726/28 |
| 2008/0091618 A1* | 4/2008 | Obrea et al. | | 705/76 |
| 2008/0091833 A1* | 4/2008 | Pizano | | 709/229 |
| 2008/0109657 A1* | 5/2008 | Bajaj et al. | | 713/168 |
| 2008/0141330 A1* | 6/2008 | Charles et al. | | 726/1 |
| 2008/0196084 A1* | 8/2008 | Hawkes | | 726/2 |
| 2008/0209529 A1* | 8/2008 | Francisco | | 726/6 |
| 2008/0229109 A1* | 9/2008 | Gantman et al. | | 713/176 |
| 2008/0295169 A1* | 11/2008 | Crume | | 726/22 |
| 2009/0089426 A1* | 4/2009 | Yamasaki et al. | | 709/225 |
| 2009/0307133 A1* | 12/2009 | Holloway et al. | | 705/44 |
| 2009/0328169 A1* | 12/2009 | Hutchison et al. | | 726/7 |

OTHER PUBLICATIONS

"DNS cache poisoning", pp. 1-4, Wikipedia. Krebs, "Security Fix", Jul. 10, 2006, 2 pages, The Washington Post.
"Slight Paranoia" "A Deceit-Augmented Man in the Middle Attack Against Bank of America's SiteKey® Service", Apr. 10, 2007, pp. 1-15.
Dhamija et al., "Why Phishing Works", Nov. 2005, 10 pages.

\* cited by examiner

*Primary Examiner* — Beemnet Dada
*Assistant Examiner* — Sayed Beheshti Shirazi
(74) *Attorney, Agent, or Firm* — Young & Thompson (57) ABSTRACT

A system and method for indicating to a user that a networked site is authentic includes a verification application configured to send a request to verify the authenticity of the networked site together with identity information about the site to a verification server. The verification application has access to encrypted user-customized information that was previously selected by a user and is encrypted and stored focally on the end-user device. The verification server verifies whether the networked site is authentic and is further configured to enable decryption of the encrypted user-customized information when a networked site is verified as authentic, so that the user-customized information can be presented to the user.

42 Claims, 7 Drawing Sheets

SYSTEM AND METHOD FOR VERIFYING NETWORKED SITES

CROSS-REFERENCE TO RELATED APPLICATIONS

This application claims the benefit of priority from U.S. Provisional Patent Application No. 60/874,267 filed Dec. 12, 2006, the contents of which are incorporated herein by reference.

FIELD OF THE INVENTION

The present invention relates to a system and method for verifying the authenticity of network sites, especially World Wide Web sites. More particularly, it relates to a system and method for indicating to a user that a site is authentic using customized information recognizable to that user.

BACKGROUND OF THE INVENTION

"Phishing" is the practice of directing users to fraudulent Web sites in an attempt to fool the user into believing he or she has accessed the legitimate Web site of a provider, such as a financial institution or e-commerce site. Despite the existence of various security measures provided by Web browsers, phishing and other spoof sites attempt to mimic the content, look & feel, and even the security features of the genuine site so that users will fail to recognize that they have not accessed the legitimate site.

In order to prevent phishing and other similar attempts to pass off fraudulent Web pages as authentic or verified sites, a number of verification logos exist in the marketplace today. These include for example VeriSign Secured™, the BBB Online™, and Comodo TrustLogo™. However, a common problem with these logos is that a user, at least initially, has no idea whether the logo is genuine or has merely been copied from a legitimate site and placed on the current provider's site. The user is required to perform some further action to verify identity. Comodo's TrustLogo™, for instance, simply allows the user to roll the mouse over the logo and thereby obtain auxiliary information intended to confirm the identity of the site. With the VeriSign Secured™ logo, the user clicks on the logo, which then brings up another browser window with information about the site. The user must then manually compare and verify this information with the information that appears in the browser's address bar in order to ascertain whether the site is authentic, i.e., that the site is trustworthy and that the provider of that site is the company or organization that it claims to be. In some instances, such as with TrustLogo™, the entire rollover information effect can be spoofed.

Unfortunately, most users are either insufficiently aware or unwilling to make the effort to properly carry out the necessary manual steps to verify that a site is in fact authentic and legitimate. See for example "Why Phishing Works," R. Damija, J. D. Tygar, M. Hearst which is available at the following Web address http://people.deas.harvard.edu/~rachna/papers/why_phishing_works.pdf, the contents of which are incorporated herein by reference. Indeed, as the above reference suggests, as many as one in four users does not even look at basic browser-based security cues such as the address bar of the browser, as a result of which they are incapable of carrying out the more elaborate steps necessary to ensure authenticity of the site.

Furthermore, because these existing logo solutions use images that are uniform across all sites, the logos may be freely copied by fraudsters (along with popup and/or auxiliary windows) rendering them susceptible to spoofing and phishing sites. For example, a phishing site www.53.com.wps.portal.secure.ansible.st may still link to the VeriSign Secured site for www.53.com even though the site names don't match. Many users will not notice the difference.

As a result, although these prior art "trust seals" are intended to assure consumers that a site is run by the party it claims to be from and/or that it will use techniques such as encryption to protect sensitive data, the ability to spoof these seals means they are not sufficiently secure for ecommerce and other sensitive on-line activities.

In an effort to provide further security to users, site providers on the Internet are increasingly using two-part (or two-factor) authentication schemes. For example, some bank logon systems are now presenting a visual icon to the user after providing some personally identifying information (PII), so the user knows he is on the correct site. While this does let the consumer know when a phishing attack has occurred, the consumer may only determine this after having already entered some PII, the integrity of the consumer's account may be at least partially compromised, and the consumer may need to cancel the account, which is time-consuming and inconvenient. Furthermore, where a banking relationship does not yet exist, such icon-based authentication systems cannot be used when initially signing up for new accounts and services since the two parties have not yet agreed on the shared image.

Moreover, even two-part authentication schemes employing hardware tokens for security have been spoofed by man-in-the-middle attacks. For instance, the paper http://paranoia.dubfire.net/2007/04/deceit-augmented-man-in-middle-attack.html, the contents of which are incorporated herein by reference, describes a proof of concept of such an attack upon Bank of America's SiteKey® service. Similarly, the Washington Post article by Brian Krebs, available at the following Web address http://blog.washingtonpost.com/securityfix/2006/07/citibank_phish_spoofs_2factor_1.html, the contents of which are incorporated herein by reference, describes an actual attack upon Citibank by a Russian attacker.

Further compounding problems with image-based authentication schemes is the fact that users with a number of relationships with various providers of goods and services need to choose a different image for each provider relationship. This occurs because providers do not share their images with each other. In addition, providers of sensitive services, such as banking, require a very low level of chance "crackability". For that reason, they may have collections of tens of thousands of icons, of which they present only a few dozen to any one user to choose from. Thus, the likelihood of a consumer being able to choose similar icons (for ease of remembrance) across multiple banks or providers is quite low. In addition, as industry use of two-factor authentication image-based authentication grows, users may be facing a case of "icon confusion" in attempting to remember which icon is associated with which provider.

As an example, in U.S. Pat. No. 7,100,049, Gasparini et al. disclose a method of authenticating a web site to a user via customization of a web page. The user must initially register with the provider's web site, and material with which to customize the web page is stored in a database at the provider's site. However, such a mutual authentication method requires a preexisting relationship between the user and the web site operator. This is problematic in the case of, for instance, a financial institution's web site for signing up a new customer. Furthermore, the personally identifying information (such as a photograph of the user) is stored outside of the user's control. Moreover, as the provider web site is serving the customization data, the provider could potentially incur liability for unauthorized or illegal content (for example, for storing pornographic images).

Similarly, in US Patent Application Publication 2006/0200855 A1, Willis discloses a system for the authentication of a plurality of electronic entities (or providers) by a plurality of users. However, the users in this system are required to register with an authenticating entity before any electronic entity can be authenticated. This is an undesirable requirement that many users will object to or otherwise fail to comply with. It also requires users to store personally identifiable information at the authenticating entity and therefore outside of the user's control.

There is therefore a need for a more effective network site verification system and method that: (i) can effectively provide a user with automatic and immediate verification without the user having to click through or otherwise carry out any additional steps after having accessed the site; (ii) can use the same user-recognizable verification information for different provider sites; (iii) do not require the user to have a pre-existing relationship with the provider of the site; and (iv) do not necessarily require the user have pre-registered or otherwise store any PII (such as a user ID or password) with or at a third party authentication entity.

SUMMARY OF THE INVENTION

The present invention overcomes the above-mentioned drawbacks associated with the use of two-part authentication schemes by service providers on computer networks such as the Internet. The system and method of the present invention provides for a uniform interface for identifying different sites prior to a user providing any PII. In accordance with the invention, user-customized information such as an image, application skin, or audio clip is selected by the user to provide an indicator that clearly belongs to that particular user. The user-customized information is encrypted and stored on the end-user device. The user-customized information is only presented to the user once the site under question is identified and authenticated. The user need not perform any other action to verify the site. Click-through or even pointing of the mouse at the customized indicator is unnecessary; although auxiliary information can optionally be provided to the user using such mechanisms.

In one aspect, the present invention provides a method of indicating to a user that a networked site is authentic. User-customized information, previously selected by a user of an end-user device, is encrypted on that end-user device. When the device accesses the networked site, a request to verify the authenticity of the networked site is received, preferably at a verification server, from the end-user device. This request is accompanied by identity information about the networked site. Whether the networked site is authentic is then verified—again preferably at the verification server. If the networked site is verified as authentic, the encrypted user-customized information is decrypted so that the user-customized information can be presented to the user on the end-user device.

In one embodiment, encryption of the user-customized information comprises: receiving at the verification server the user-customized information together with security information from the end-user device; determining at the verification server a set of encryption parameters including an encryption key; encrypting the user-customized information at the verification server based on the encryption parameters; and sending the encrypted user-customized information to the end-user device together with a subset of the encryption parameters, the subset not including the encryption key. In this embodiment, when the end-user device accesses the networked site, the verification server additionally receives the encrypted user-customized information and the subset of encryption parameters from the end-user device, and decryption of the user-customized information comprises decrypting the encrypted user-customized information at the verification server and then sending the decrypted user-customized information to the end-user device (over a secure communication channel).

In an alternative embodiment, encryption of the user-customized information comprises: determining at the verification server a set of encryption parameters including an encryption key; and sending the set of encryption parameters including the encryption key to the end-user device so that the user-customized information can thereafter be encrypted on the end-user device using said encryption parameters. Here, when the end-user device accesses the networked site, the verification server additionally receives the set of encryption parameters from that device, and decryption of the user-customized information comprises sending a decryption key to the end-user device to enable decryption of the user-customized information at the end-user device (again preferably over a secure communication channel). The encryption parameters may include a key identifier, in which case the encryption key and the decryption key are purged from the end-user device once encryption and decryption have respectively been carried out.

In preferred embodiments, the user-customized information comprises at least one of the following: an image and an audio recording, and the method may further comprise providing an application to the end-user device that enables the user to select the user-customized information. Furthermore, this information may be presented to the user on the end-user device as a component of a verification seal and as part of the content of the networked site. Preferably, the encrypted user-customized information is only stored locally on the end-user device and not at the verification server.

The method may further comprise, when the networked site is verified as authentic, sending supplementary data about a provider of the networked site from the verification server to the end-user device so that the supplementary data can be presented to the user on the end-user device.

The identity information preferably comprises at least one script variable value in an object model of a browser used to access the networked site on the end-user device, the at least one script variable relating to at least one of the following properties of the networked site: hostname and IP address. Alternatively and/or additionally the identity information may comprise hostname data gathered from a digital certificate of the networked site. Verifying whether the networked site is authentic may further comprise evaluating a response provided by a server of the networked site in reply to an authentication challenge in addition to the identity information provided for the network. The authentication challenge may be generated from a nonce that is cryptographically tied to a session cookie on the end-user device.

Advantageously, the presentation of the user-customized information to the user effectively occurs immediately upon the user accessing the site, without the user needing to "click through" or otherwise take any verification steps. This immediate presentation of customized indicia avoids the problems with prior art verification systems where many users do not bother to click the seal icon and take the necessary steps to verify that the site is in fact authentic. It further allows even users who are not technically savvy to obtain assurance that the provider site is genuine since the user-customized information is instantly recognizable to the user.

In another aspect, the present invention provides a system for indicating to a user that a networked site is authentic comprising a verification application and a verification server. The verification application comprises computer-readable program code residing on an end-user device and is configured: when the end-user device accesses the networked site to send, via the network, a request to verify the authenticity of the networked site together with identity information about the networked site; and to access encrypted user-customized information stored locally on the end-user device, the user-customized information having been previously selected by a user of the end-user device. The verification server is configured to receive, via the network, the request to verify from the verification application and to verify whether the networked site is authentic. The verification server is further configured to enable decryption of the encrypted user-customized information when a networked site is verified as authentic so that the user-customized information can be presented to the user on the end-user device.

In another aspect, the present invention provides a method of allowing a user to verify the authenticity of a provider of a networked site. The method comprises embedding within the content of the networked site a link to invoke a verification application on an end-user device, where the verification application is configured to communicate with a verification server to enable the verification server to authenticate the provider based on identity information provided by the verification application. The method further comprises, upon verification of the networked site by the verification server, presenting user-customized information to the user on the end-user device as part of the content of the networked site. As noted above, a user of the device has previously selected the user-customized information.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

Figure 1:
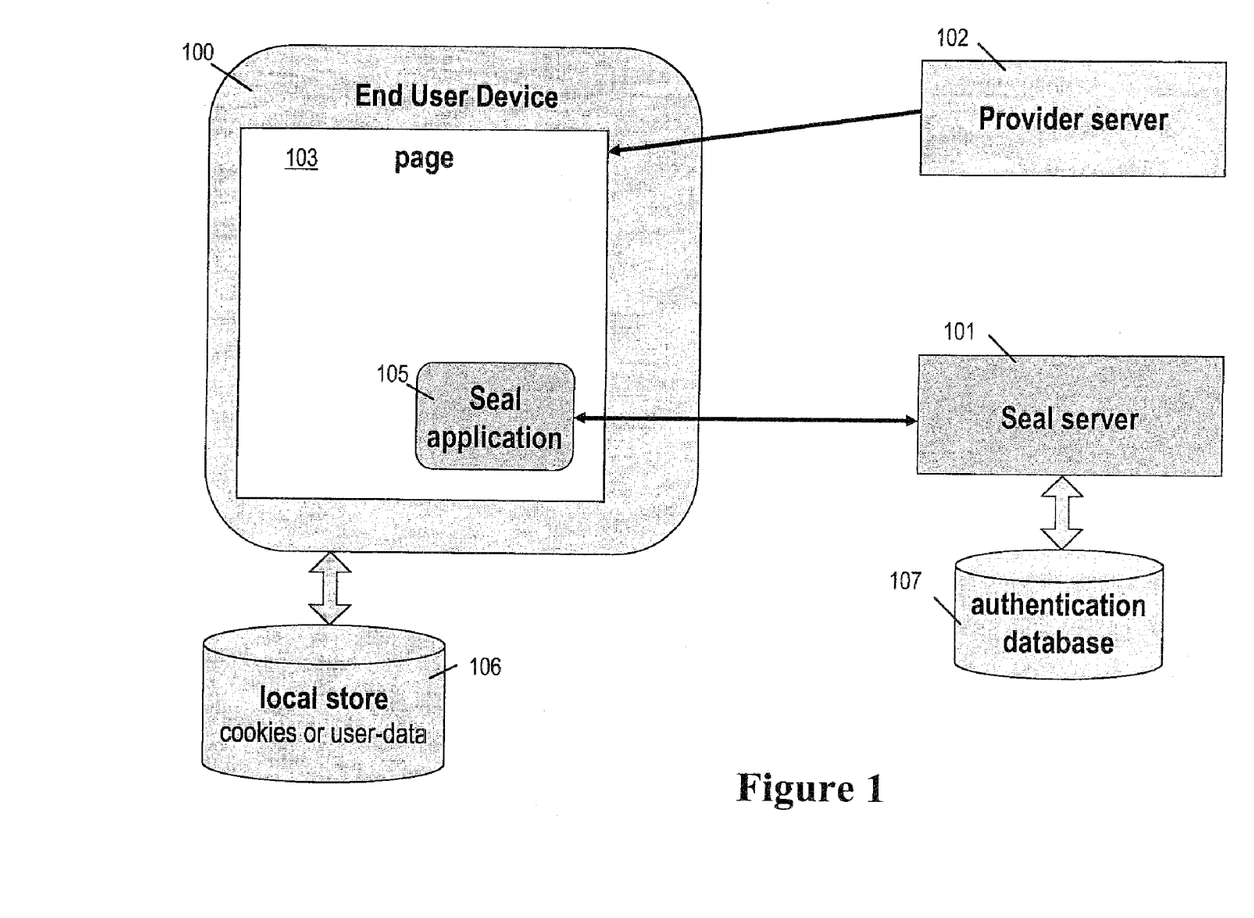
FIG. 1 is a block diagram showing a general overview of a preferred embodiment of the site verification system.

In accordance with a preferred embodiment, FIG. 1 is a block diagram providing a general overview of a system for verifying the authenticity of network sites, in particular World Wide Web sites, using customized information recognizable to a user. As shown in FIG. 1, an end-user device 100 is configured to receive and display the content of a page 103 that is downloaded over a network from a networked site provider's server 102. As is well known, the network is typically the Internet, and server 102 is typically a Web server. Provider server 102 may be the Web server for a bank, e-commerce site, or other site intended to exchange confidential information with users. End-user device 100 is the combination of hardware and software used by a user to view network or Internet content, for instance a personal computer, mobile telephone, or other networked device running browser software such as Mozilla Firefox™.

As shown, part of the content of page 103 references a verification (or "seal") application 105 that is to be invoked locally on the end-user device 100 or downloaded from a verification (or "seal") server 101. In some embodiments, the seal server 101 may be the same server as (or otherwise related to) provider server 102, however seal server 101 is preferably run by a trusted party that is independent of the provider and thus located at a different network location on the Web so that it is remote (i.e., at a different, unrelated network address) from provider server 102. In this manner, several different provider servers 102 may take part in the verification system of the present invention. It will also be appreciated that seal server 101 may for example comprise a plurality of server systems operated by the same party (or related parties), and that such server systems may or may not be physically located at the same location or network address (and in fact for traffic-handling purposes it may be preferable to disperse them geographically). The end-user device has local storage 106—which in some embodiments may be the local file system (where permitted)—containing user-specific information such as browser cookies, Flash Shared Objects, or other user data. As shown in FIG. 1, seal server 101 also preferably has secure access to authentication database 107 containing information about authentic or "genuine" provider sites.

In a preferred embodiment, and in a similar manner to known trust/authentication schemes, a provider site wishing to participate in the verification system of the present invention "registers" with the verification authority running seal server 101 and, upon approval, information relating to that provider site (notably its true domain name and IP addresses) is stored in database 107. However, in other embodiments, the verification server need not have any pre-existing information about a provider site, and instead simply verifies that a site is who it says it is (and in this case authentication database 107 may not be used).

Initially, the verification or seal application (or "seal") 105 may be dynamically downloaded from a trusted third party source (typically affiliated with the verification server 101) or otherwise installed on the user's computing device 100. As will be explained further below in connection with FIGS. 6 and 7, prior to effecting any verification of a provider site, the user preferably configures seal application 105 by selecting user-customized information (such as an image, "skin", and/or audio clip) that is encrypted and stored locally in 106 on device 100 (or is otherwise locally accessible to the end-user device, e.g., on an associated local area network). Preferably, and as described further below, seal server 101 has no access to or any specific knowledge of this user-customized information. Although the user must carry out this initial configuration step to enable device 100 to operate in the site verification system of the present invention, there is no need for the user to register with, or otherwise provide any personally identifiable information to, the seal server (or any other party) in order to install seal application 105. As described below, in alternative embodiments, the initial configuration of the user-customized information may alternatively be carried out by a customized information editor application that is related to (or forms a sub-component of) the seal application.

Preferably the user-customized information includes some type of multimedia content such as an image, video, and/or audio clip, although a simple alphanumeric password could also be used. By allowing each user to personally select this customized information (for instance, the user may choose a picture of himself, a family member, or a pet or an audio recording of his choosing such as a mobile ringtone-like audio clip), each user can select information that is immediately recognizable and has long-term memory retention for the user. Alternatively, the user-customized information may be generated and assigned by the seal application running on the end-user device (for example, on a pseudo-random basis), again preferably without the seal server 101 having any record of this information.

As described below, in accordance with the present invention, seal application 105 is invoked in response to a request encoded within a provider's network-accessible content. Once invoked, the seal application can then initiate verification of the authenticity of a provider site in the manner described below. When it has done so, the seal application displays, plays or otherwise presents the user-customized information to inform the user that the site's seal is genuine and not just an image copied from another Web site.

Figure 2:
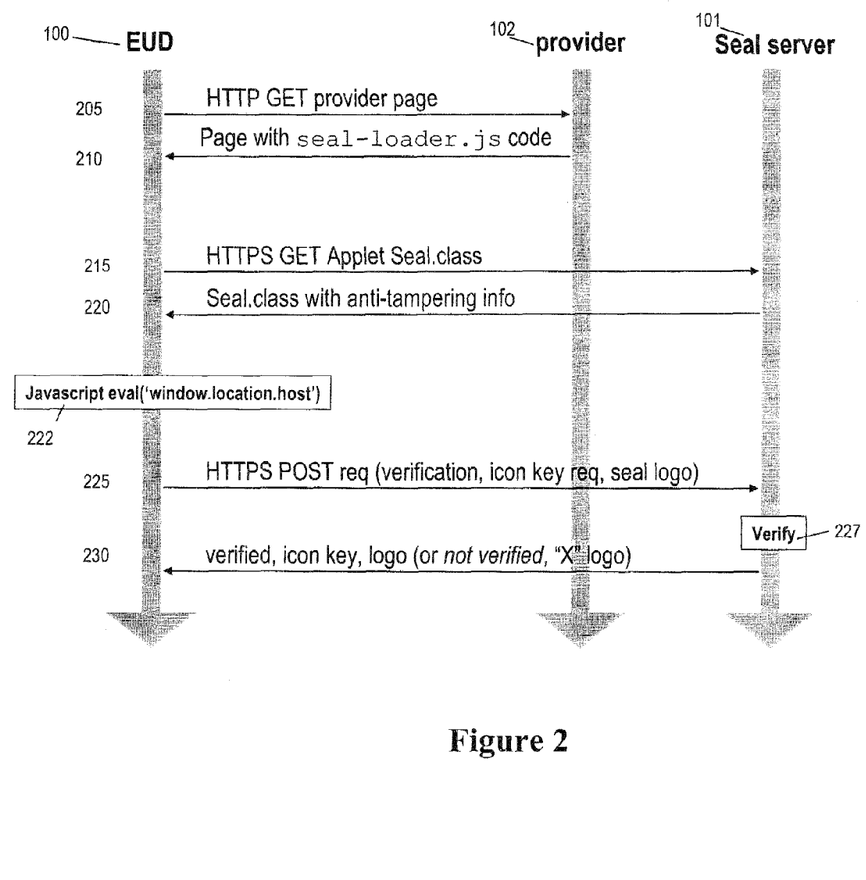
FIG. 2 is a ladder flow diagram depicting communication between the entities in the system of FIG. 1 in a method of site verification according to one embodiment of the invention.

FIG. 2 depicts the communications between end-user device 100, provider server 102 and seal server 101 as a ladder flow diagram. As an initial step (not shown), the user configures his device by selecting user-customized verification information as described above. At step 205, end-user device 100 downloads a page from provider server 102. As noted, provider server 102 may belong to an e-commerce site, a financial institution or any other entity dealing in confidential or sensitive information, be it financial or otherwise. In order for the provider to establish to the user that the page is authentic, at 210, provider server 102 serves the content of a provider's page together with a link to the seal application 105, thereby effectively embedding the seal application in the content of the served page.

In one embodiment, seal application 105 is already resident on end-user device computer having been fully downloaded by the user during the initial configuration stage. Alternatively, the user may only download a related customized information editor application (which may or may not be a component of seal application 105) that enables the selection and any initial configuration of the user-customized information, and the page served by provider server 102 includes instead a link to download application 105 from seal application server 101. This latter option, shown in FIG. 2, is preferable where it is desirable to ensure that only the latest version of seal application 105 is used for verification purposes. Anti-tampering techniques may be used to ensure that only recently downloaded applications can communicate back to the seal server if such communication is needed.

In the illustrated embodiment of FIG. 2, seal application 105 is downloaded each time it is used in the form of a Java applet, and the code for invoking the applet is stored in a Javascript file, called seal-loader.js (as will be appreciated, other types of code could also be used, for e.g., Macromedia Flash objects.) If needed, the end-user device can also request the seal-loader.js code from seal server 101. At step 215, end-user device 100 then requests the actual applet from seal server 101. The seal server 101 responds with executable code in response 220. As will be appreciated by those skilled in the art, the requests to seal server 101 preferably include anti-tampering technology, so that seal server 101 may check requests for validity (using the anti-tampering technology) before responding to requests from the downloaded seal application.

Generally, once invoked, seal application 105 collects identity information about a provider site and then forwards this information to seal server 101. The identity information may include (but is not limited to) the value of the DOM variable window.location.host, the name associated with an SSL certificate or a session challenge/response pair. Depending on the nature of the identity information received by seal server 101, it may then verify that the true domain name and/or IP address of a provider's site is authentic or genuine in various different ways.

In one embodiment, in order to allow seal server 101 to carry out authentication, seal application 105 uses Javascript to determine the value of the variable window.location.host in the browser's document object model (DOM), as shown in step 222. As will be appreciated, this value cannot be easily spoofed, because changing it has the side effect of changing the page the end-user's web browser is visiting. In addition, to provide a more secure level of authentication where the provider server has an SSL certificate, seal application 105 may invoke the browser to request the provider page by using the HTTPS protocol rather than HTTP in steps 205 and 210. In this case, if the hostname or domain name associated with the certificate does not match the hostname from window.location.host, the identity of the provider will not be confirmed or authenticated.

As will be appreciated by those skilled in the art, sophisticated attacks on a DNS system such as DNS poisoning (which is described in the Web entry http://en.wikipedia.org/wiki/DNS_cache_poisoning, the contents of which are incorporated herein by reference), may allow a non-authentic Web page to appear in a browser with an incorrect window.location.host variable value. The use of SSL certificate data can circumvent most such attacks, although a very highly sophisticated attack in which DNS for SSL connections is properly resolved but non-SSL connections are otherwise "poisoned" may still theoretically be possible. For this reason, an embodiment using an even higher level of security (albeit with higher computational costs) is also described further below in connection with FIG. 3. Such higher security may be desirable for certain types of provider sites such as financial institution sites. Nevertheless, for most practical applications, the evaluation of window.location.host with or without SSL certificate data provides a reasonably secure level of authentication.

At step 225 of the illustrated embodiment, the identity information (window.location.host) of the provider server or host of the site accessed by the user is sent by application 105 to seal server 101 along with a request to enable decryption of the user-customized information. At step 227, seal server 101 verifies that the provider is an authorized provider per the information sent in message 225. In this embodiment, assuming verification requires that all genuine provider sites have "registered" with or at least be known to server 101, verification notably includes verifying that the value of window.location.host is found in authentication database 107. On the other hand, in another embodiment, verification server 101 may not have any pre-existing information about a provider site, and instead simply verifies that a provider site is who it says it is by ensuring that the hostname associated with window.location.host matches the hostname associated with the provider site SSL certificate. In yet another embodiment, the seal server may provide an indication to the user of the level of verification the server was able to perform. For example, the server 101 may indicate a "yellow light" authentication when the provider site is not known to it (i.e., not in database 107) but otherwise provides an SSL certificate match, and a "green light" authentication when the site passes both of these checks.

If server 101 verifies that the provider site is authentic, the seal application enables decryption of the user-customized information stored on the end-user device (as described below) so that this information can be presented to the user, preferably as part of the provider's page. In particular, in the illustrated embodiment of FIG. 2, server 101 responds in message 230 with verification status (i.e., whether verified or not), plus encryption keys to unlock or decrypt the encrypted user-customized information (assuming the site is verified as authentic). The end-user device then uses these keys to unlock this information and display a customized seal 400 (FIG. 4) to the user.

Figure 4:
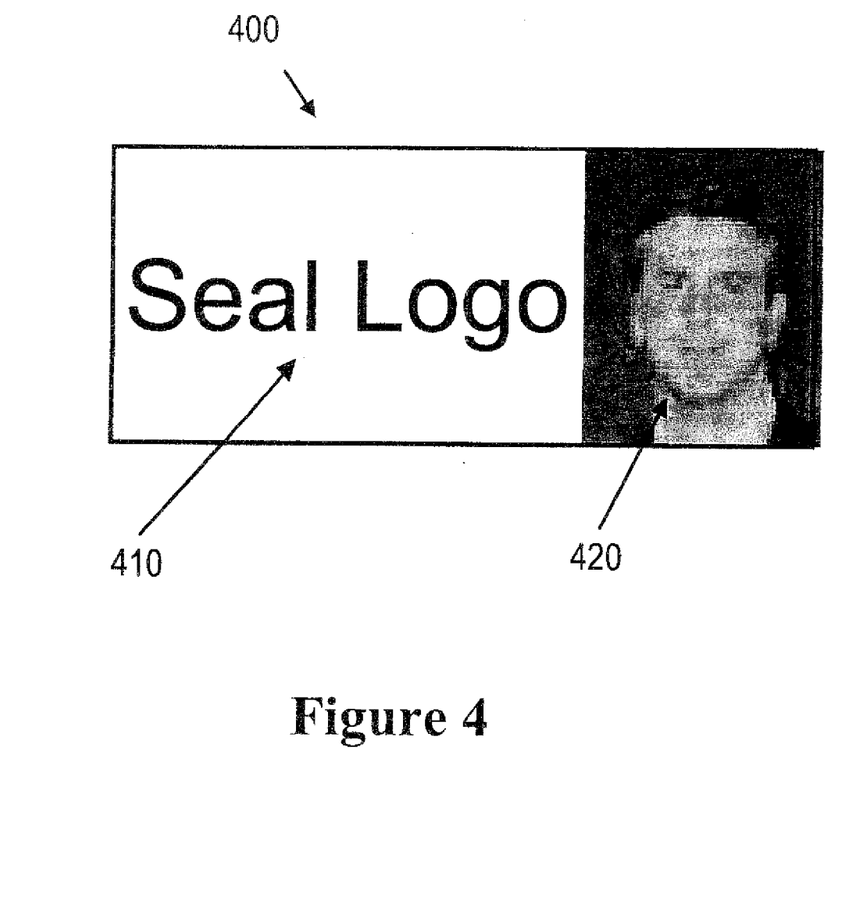
FIG. 4 is an example of a seal icon including user-customized information.
Figure 5:
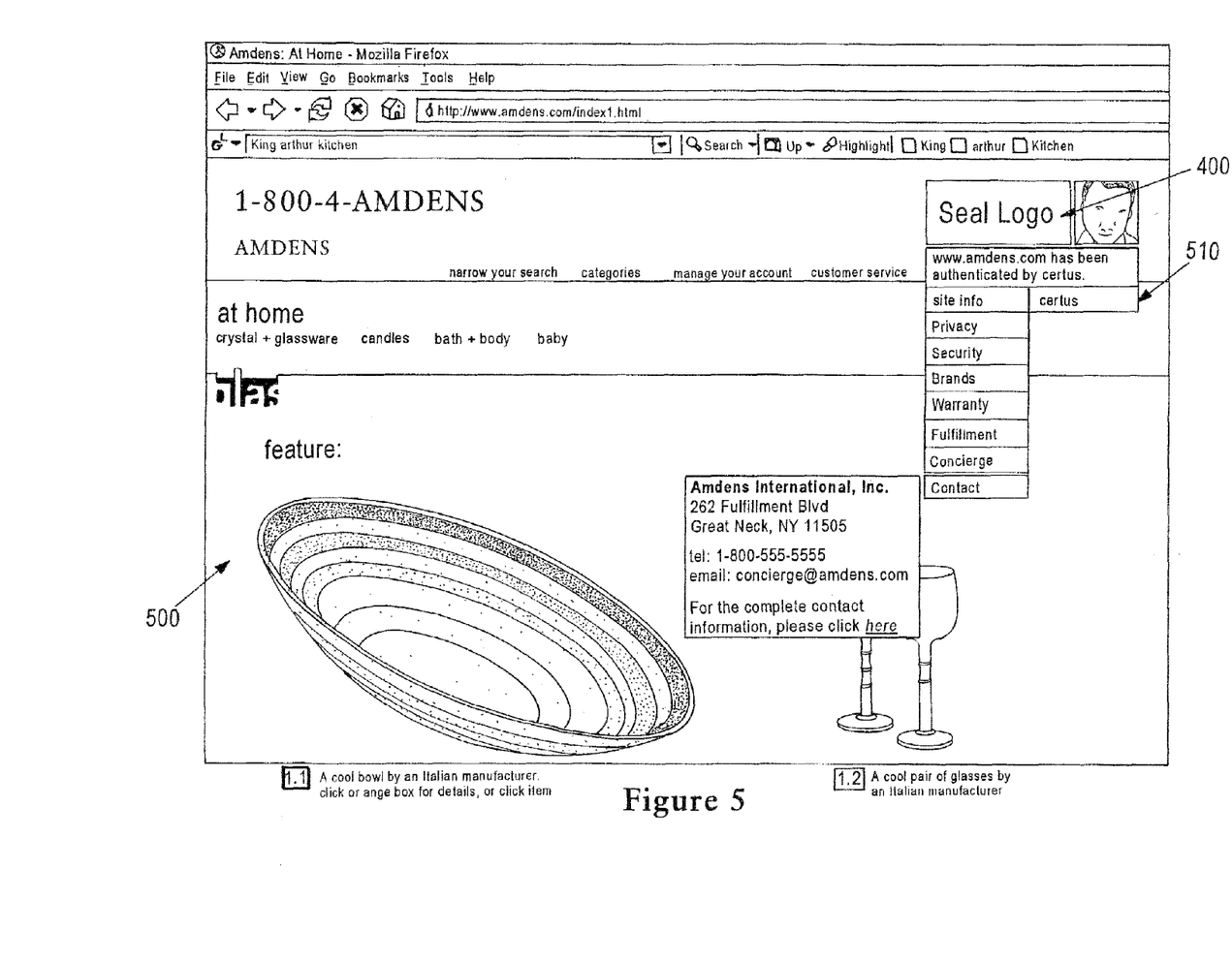
FIG. 5 is an example of a provider's Web page that has been authenticated by the system and method of the present invention and displays the seal icon of FIG. 4 and supplementary verification information to a user.

As illustrated in FIG. 4 and described further below, the user-customized information may be presented to the user as a component of a seal 400. As shown in FIG. 5, customized seal is preferably displayed as part of the content provider's Web page 500 and may include supplementary data 510 for the user. If verification is to be supplemented or confirmed by such additional provider-specific data or information 510 residing at the seal server site, a request for that data is sent to seal server 101 (along with the identity of the host as determined by window.location.host) prior to the unlocking of the encrypted information. This is shown at step 225 in FIG. 2 where the message contains requests for other optional information such as logos, provider policies, brands the provider is authorized to sell, etc. In this manner, the size of the Seal.class applet can be kept small, allowing information to be downloaded only when actually needed.

In some embodiments of the present invention, enhanced security may be desirable and authentication of the provider may require more information than the identity information provided by either window.location.host or an SSL certificate. In particular, to more effectively combat DNS spoofing and other similar techniques, the provider 102 and seal server 101 may share an array of secret information, i.e., p_secret, that is out of band from the authentication process. These shared secrets can then be employed in a challenge/response fashion in the following manner, where the response to the challenge contains information that only the provider and the seal server are aware of and have access to Here, the challenge and response are also sent by seal application 105 to the seal server 101 as identity information (or "identity credentials").

For a challenge/response authentication of the provider, over either an HTTP or HTTPS connection, the value of a session cookie SC (shared between the seal server 101 and end-user device 100 and associated with the end-user device session) is used by the seal server 101 (or alternatively by seal application 105) to create a nonce that is cryptographically tied to the session cookie SC. For the case where the seal server creates the nonce, this can be done in the following manner:

nonce=Hash(secret[k]+Hash(SC))

where the secret array is known only to the seal server 101. The nonce is then used to create challenge C:

C=<k,nonce>

A provider response R to this challenge is as follows:

R=<k,m,Hash(p_secret[m]+nonce)>

In the case where the seal application generates the nonce, this can be done as follows:

secret=Random( )

nonce=Hash(secret+Hash(SC))

C=<nonce>

R=<nonce,m,Hash(p_secret[m]+nonce)>

The seal application in this case must also send the value of secret to the seal server in the verification request, so the seal server can check to make sure the nonce is tied to the session cookie SC. One skilled in the art will appreciate that these and related variants achieve the same goal, but with the computation distributed differently across the relevant parties.

Since the array of secrets p_secret is shared between the provider and seal server, the seal server can verify the identity of the provider. Furthermore, at any time seal server 101 can change or revoke the shared secrets should the provider no longer meet the authentication requirements. The indices k and m above allow for key rotation and maintenance. In some embodiments, the values of k and m may be identical, allowing for one less parameter in the system. This may be desirable if it is otherwise cryptographically acceptable.

Figure 3:
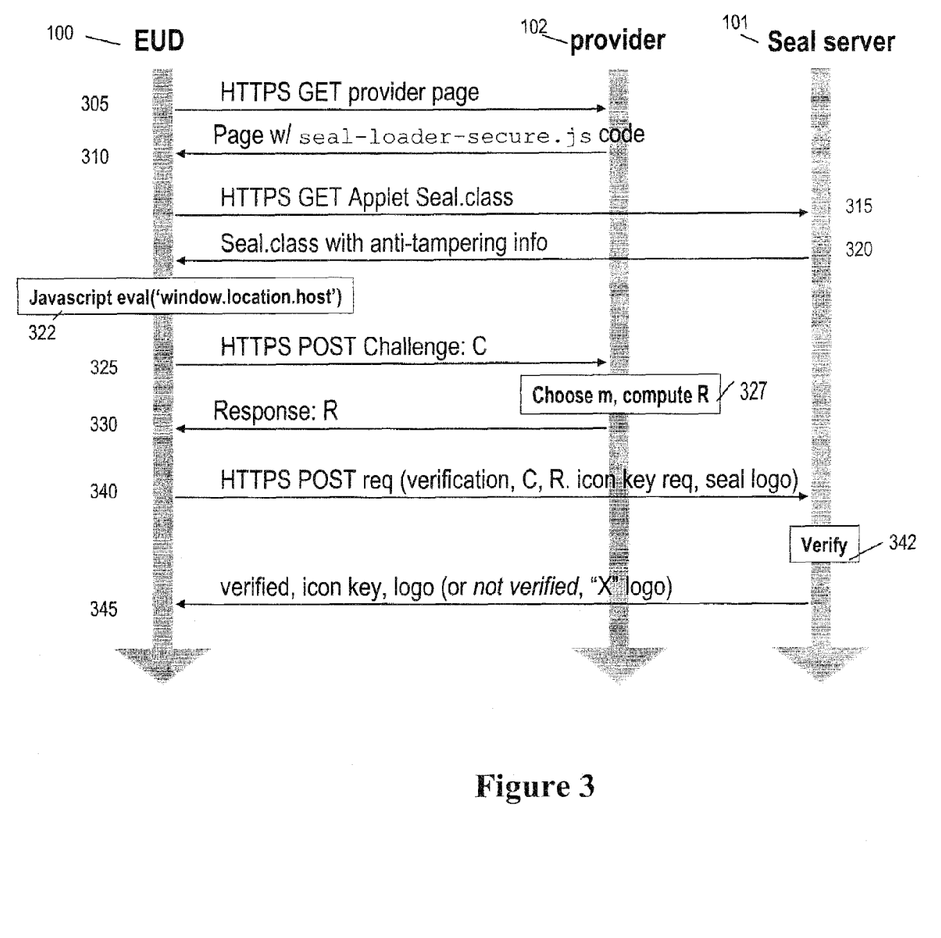
FIG. 3 is a ladder flow diagram depicting communication between the entities in the system of FIG. 1 in a method of site verification according to another embodiment of the invention.

FIG. 3 depicts the communications between end-user device 100, provider server 102, and seal server 101 as a ladder flow diagram, with the network verification system employing the above-described enhanced authentication steps. As in FIG. 2, end-user device 100 initiates a request to the provider server 102 for a page on which the provider wishes to include the authentication seal. For maximum security, this should occur over an HTTPS connection, as shown in request/response steps 305 and 310. In message steps 315 and 320, the end-user device requests and receives seal applet 105 from the seal server 101. In step 322, seal application 105 communicates with the browser via Javascript and evaluates window.location.host. The seal application 105 then uses this address to initiate a secure connection to the provider server 102 in which it posts the challenge at step 325. At step 327, the provider server computes the response R and sends it to the seal applet in message step 330. In some cases, due to browser security restrictions (Same Origin Policy), the seal application may perform this request/response pair in Javascript that has been injected into the provider's page 103. As will be appreciated by those skilled in the art, other alternatives to dealing with the Same Origin Policy may also be employed, such as multiple instances of a single Java applet sharing a static member field used for communication.

Still referring to FIG. 3, at message step 340, seal applet 105 forwards R, along with a request for the user data keys and any other material it needs to display the seal, to the seal server. The seal server verifies the challenge/response and any other relevant data in step 342, and then returns the requested information, including decryption keys, in response message step 350. Provided the authentication was successful, the end-user device uses these keys to decrypt the user-customized information and to display the customized seal 400 to the user.

The above-described challenge/response steps occur as an interaction between seal application 105 and provider server 102, although seal server 101 may provide some assistance, such as providing application 105 with the nonce that is cryptographically tied to the seal application's session cookie with the seal server.

In an alternative embodiment, after receiving a request to verify a provider site from the seal application 105, the seal server 101 may generate and issue a challenge directly to the provider server without involving seal application 105. However such an embodiment may be more vulnerable to DNS cache poisoning attacks, and therefore is less preferred.

In the exemplary embodiment of FIG. 4, the seal consists of two parts: a seal logo 410 and a user-customized icon/information 420 (e.g., a digital image of an individual). These are placed side-by-side in FIG. 4, but the seal logo could alternatively be superimposed onto the user-customized image. More generally, it will be appreciated that FIG. 4 provides only an illustration of one possible embodiment of a seal 400 comprising two components: the trust logo 410 may display the brand of the seal and the customized information 420, in this case an image. Since this icon/information is selected by the user and then stored securely and encrypted on the user's machine, it is very difficult for an attacker to create a replica seal. Audio can also be encrypted and programmed to play only if the provider site has been authenticated. Other kinds of customization, such as decorative borders or "skins," can be selected, additionally or alternatively. These examples of user-customized information are illustrative only.

FIG. 5 shows the seal placed on a web site 500, with additional information 510 presented as the user moves the mouse over the seal. In this case the verification seal is also being used to provide information about the provider (i.e., the company that owns the Web site or on whose behalf it is run), including its privacy and security policies, the brands it is authorized to sell, and the contact information for the company. This additional information may be stored in database 107. Supplementary information 510 can be passed from the seal server to the end-user device and presented to the user when the user clicks on or moves the mouse over the seal 400.

In accordance with the present invention, customized information or content resident on the end-user device 100 is unlocked and displayed only if the provider site has been authenticated. With the presentation of the customized information upon authentication, a user can rapidly and easily determine at a glance (or at a listen, if sound is employed) that the provider site is authentic. There is no confusion or uncertainty associated with examining address bars in browsers, checking for locked or unlocked padlock icons, or clicking-through to get verification information. Even consumers who are not sophisticated enough to examine a browser's security features are still able to verity the site's authenticity by simply determining whether or not their customized information is presented to them. Where that information or icon has personal meaning, for example a photo of one's self, family member, or pet, recognition is effectively automatic and the absence of the proper information or icon is readily ascertained.

Furthermore, the provider site is authenticated to the consumer prior to the consumer providing any personally identifiable information such as a username or password. The customized information is tied to the user rather than to the provider; and the same customized information can be used by a consumer to verify any provider site that participates with the seal server in the site authentication system of the present invention. As a result, a user does not have to memorize different icons or sets of information for different providers.

In this manner, the user-customized information is not stored in nor is it accessible by a provider's server 102, and no preexisting relationship between the user and a Web site operator is required. In addition, the verification system and method of the present invention works across multiple providers, as long as there is a relationship between each provider and the seal server. As a result, the system and method of the present invention is well-suited for the authentication of a provider web site for all potential users, even if the users have no relationship with the provider and have never visited the provider's site before.

Thus, using identity information provided by the seal application 105, the seal server 101 acts as the authenticating entity, but importantly users are not required to register with the seal server as they are with authentication entities in prior art icon-based systems. The only initial step that a user must carry is the initial configuration of the user-customized information as will now be described further below.

Figure 6:
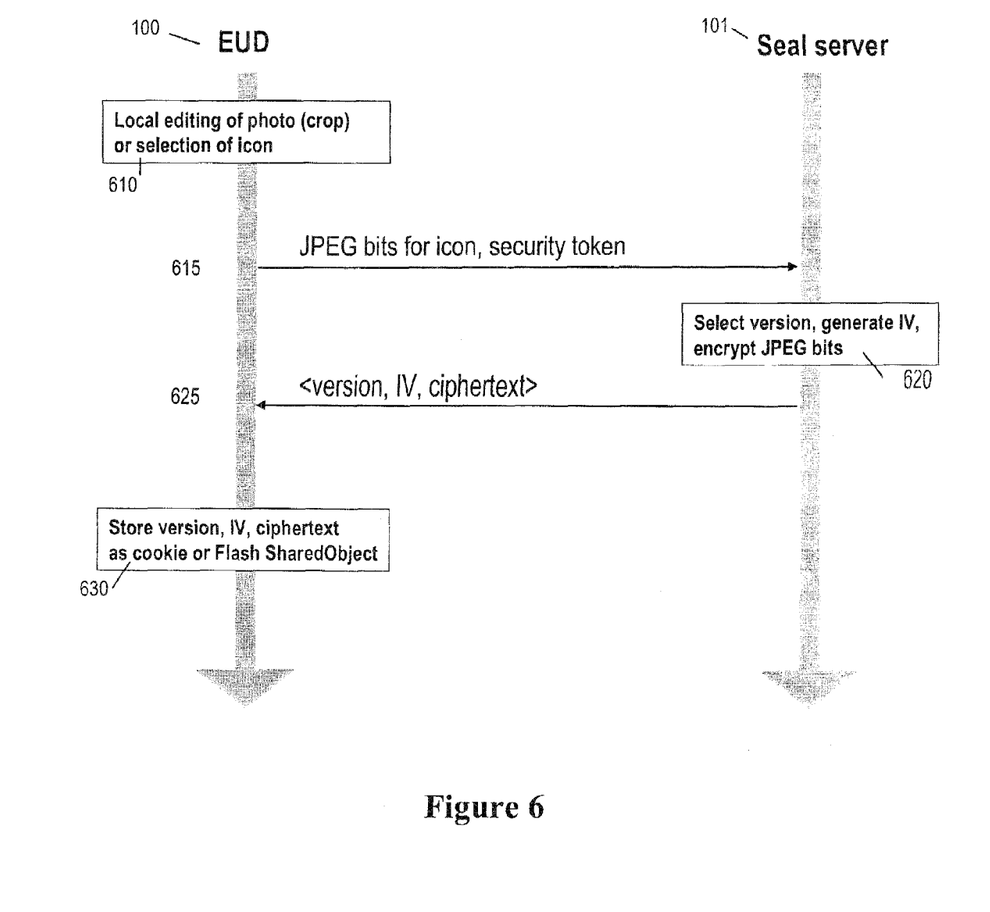
FIGS. 6 and 7 are ladder flow diagrams illustrating communication between the seal server and the end-user device during the customization and encryption of the user-customized information according to additional embodiments of the invention.
Figure 7:
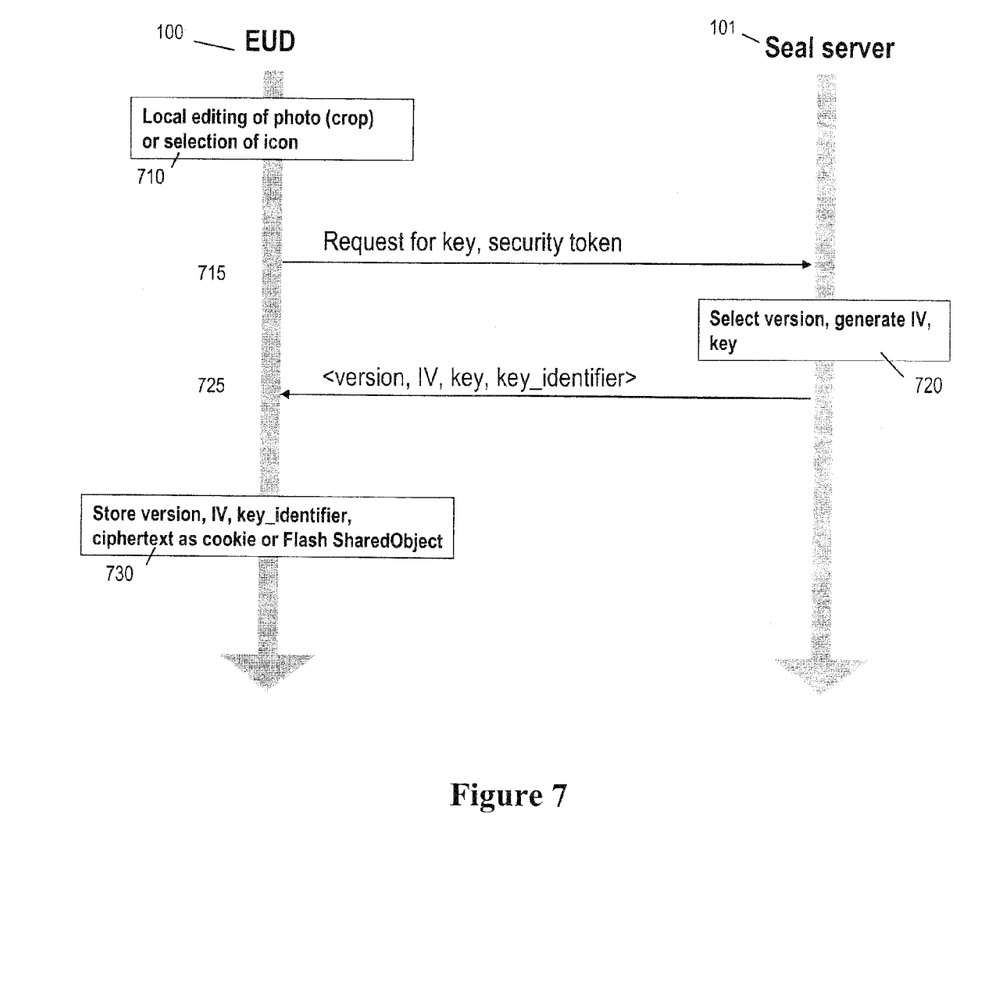

Generally, in the verification system of the present invention, seal application 105 and seal server 101 communicate with one another to enable both encryption and decryption of the user-customized information. Preferably, seal server 101 manages encryption keys for the user's customized information without ever needing to be in possession of or to store that information. FIGS. 6 and 7 are ladder flow diagrams illustrating the customization and encryption of the user-customized information in accordance with different embodiments of the invention. As described above, in preferred embodiments, the user-customized information is encrypted and stored only on end-user device 100. The seal application 105 can store encrypted data in a variety of different manners in order to protect against spoofing or any other form of unauthorized access. For instance, encrypted data can require a user password to unlock, and the seal server 101 may manage encryption keys for the user-customized information without seal server 101 ever being in possession of the user's data. The data can be stored on the user's file system as application data (if seal application 105 has or is granted sufficient privileges), or it can be stored in a browser cookie or as a Flash Shared Object. In alternative embodiments, the user-customized information may be managed by the seal server or by a trusted third party effectively acting as an escrow agent. Again, however, the user would not be required to register with these entities.

FIG. 6 shows a preferred embodiment for configuring (selecting, encrypting, and storing) the user-customized information 420 locally on the end-user device 100. As noted above, the initial configuration of this information is necessary before a user participates (or at least once a user begins to participate) in the network verification system and method of the present invention. It will be appreciated that, for introductory purposes, a generic or default icon may be initially be used to indicate to a user that a site is authenticated while simultaneously inviting a user to select/configure his or her own customized information. The user-customized information may also be subsequently reconfigured when desired by the user or otherwise necessary.

Referring to FIG. 6, the user-customized information (here an image icon) is created either by selecting the icon from a pre-determined list of icons, or, as illustrated, via a downloaded editor application running on the end-user device 100. When editing at step 610 is complete, a set of bits representing an image is created, using an image format such as JPEG or GIF. At step 615, the digital image is sent to the seal server 101 in a message that includes a security token or other security information. In processing step 620, the seal application server 101 determines (i.e., selects and/or creates) a set of desired encryption parameters. In the illustrated embodiment, server 101 selects a version number to identify the key information, associates a key with the version number, creates a random initialization vector (IV) for a bulk encryption algorithm (such as AES or 3DES), and encrypts the image data using that key and IV.

The resulting ciphertext version of the image data is sent back from server 101 to the end-user device 100 in message step 625, along with the version (but not the key) and the IV. The resulting data string is stored on the end-user device 100 in step 630. The data can be stored in any location accessible to the end-user device 100, but preferably it is stored in a persistent storage facility such as the SharedObject facility of Adobe™ Flash or, alternatively, in the cookies file of the end-user device 100's browser.

Upon verification, decryption of the user-customized information is carried out in the reverse manner. The encrypted data (cipher text) and security information is sent back to seal server 101. Preferably this occurs in request message 225 (FIG. 2) in order to avoid extra request/response pairs. Seal server 101 then selects the appropriate decryption key, and the plaintext customized information or icon bits as decrypted by seal server 101 are sent back to the end-user device in response message 230 (again preferably over a secure communications channel). In this way, the keys for the encrypted customized icon are never stored on end-user device 100 (indeed they are never even resident on device 100).

In the above-described embodiment of FIG. 6, the customized image data bits are sent as plaintext to the seal server 101 at step 615, although in a preferred embodiment the communications channel is secure. Even though this information is never stored on seal server, its transmission may create a concern for some users. Thus in the alternative embodiment of FIG. 7, the customized information or icon is encrypted and stored in a manner that does not involve transmitting it to the seal server 101. Instead, an encryption key is created on seal server 101 (along with a key identifier and other encryption parameters) and the key, together with its identifier, are then transmitted to the end-user device 100. The communication flow in FIG. 7 is similar to that in FIG. 6, except that the request message 715 does not contain the user-customized image/icon data. Instead, the seal server 101 creates a version, initialization vector (IV), an encryption key, and an associated key identifier. Server 101 then sends this set of encryption parameter to the end-user device 100 at step 725. As shown at 730, the end-user device 100 encrypts the image data using the encryption key and IV, and the version, IV, and key identifier are stored (along with the encrypted image data) on the end-user device 100. The stored encryption parameters do not contain the encryption key, which is purged from memory after it is used to encrypt the image data. The seal server 101 can use the key identifier at a later stage to recover the actual key. One way to do that is to create the key identifier by E(key, secret), where E is a symmetric encryption function and the secret is known to the seal server but not to the end-user device. One of ordinary skill in the art will appreciate that this is but one of many ways of generating a key identifier.

In the embodiment of FIG. 7, decryption of the user-customized information is carried out as follows: The stored encryption parameters (i.e., the version data, key identifier and other application security information) are sent back to the seal server 101 (again preferably in request message 225 of FIG. 2, to avoid extra request/response pairs). The response includes the decryption key in the clear, although this is preferably sent over a secure/encrypted channel in message step 230 of FIG. 2. The end-user device 100 then uses the key to decrypt the ciphertext to re-create the image data (or other user-customized information) in the clear. The key is then also purged from the end user device 100's memory to mitigate the chance of an attacker gaining access to the key.

In this manner, the seal application 105 on end-user device 100 can decrypt and present the user-customized information to the user whenever the provider's site is determined to be authentic (after communicating with the provider site to verify identity). This user-customized information then provides (at least in part) a seal allowing the user to rapidly determine that the site is genuine, without any additional effort or steps on the user's part.

While the invention has been described in conjunction with specific embodiments, it is evident that numerous alternatives, modifications, and variations will be apparent to those skilled in the art in light of the foregoing description. For example, while invoking of the seal application via Java Script was described, the seal application may be invoked using any suitable programming language or script (such as HTML).

The invention claimed is:

1. A method of indicating to a user that a networked site is authentic comprising:
   enabling encryption of user-customized information, the encrypted user-customized information being stored locally on an end-user device, and the user-customized information having been previously selected by a user of the end-user device;
   when said end-user device accesses the networked site, receiving from said end-user device a request to verify the authenticity of the networked site together with identity information about the networked site;
   verifying whether the networked site is authentic; and
   when the networked site is verified as authentic, enabling decryption of the encrypted user-customized information so that the user-customized information can be presented to the user on the end-user device,
   wherein enabling encryption of the user-customized information comprises:
      receiving at the verification server the user-customized information together with security information from the end-user device;
      determining at the verification server a set of encryption parameters including an encryption key;
      encrypting the user-customized information at the verification server based on the encryption parameters; and
   sending the encrypted user-customized information to the end-user device together with a subset of the encryption parameters, said subset not including said encryption key.

2. The method of claim 1, wherein the request to verify is received at a verification server that is remote from the end-user device, and verifying whether the networked site is authentic occurs at the verification server.

3. The method of claim 2, wherein the verification server is also remote from a server of a provider of the networked site.

4. The method of claim 1, further comprising, when said end-user device accesses the networked site, additionally receiving from said end-user device the encrypted user-customized information and the subset of encryption parameters; and wherein enabling decryption of the user-customized information comprises decrypting the encrypted user-customized information at the verification server and sending the decrypted user-customized information to the end-user device.

5. The method of claim 4 wherein the decrypted user-customized information is sent to the end-user device over a secure channel.

6. The method of claim 2 wherein the method further comprises, when the networked site is verified as authentic, sending supplementary data about a provider of the networked site from the verification server to the end-user device so that the supplementary data can be presented to the user on the end-user device.

7. The method of claim 1, wherein the identity information comprises at least one script variable value in an object model of a browser used to access the networked site on the end-user device, the at least one script variable relating to at least one of the following properties of the networked site: hostname and IP address.

8. The method of claim 1, wherein the identity information comprises hostname data gathered from a digital certificate of the networked site.

9. The method of claim 1, wherein verifying whether the networked site is authentic comprises evaluating the identity information provided for the networked site and further evaluating a response provided by a server of the networked site in reply to an authentication challenge.

10. The method of claim 9, further comprising generating the authentication challenge from a nonce that is cryptographically tied to a session cookie on the end-user device.

11. The method of claim 1, further comprising providing an application to the end-user device that enables the user to select the user-customized information.

12. The method of claim 1, wherein the user-customized information comprises at least one of the following: an image and an audio recording.

13. The method of claim 1, wherein the user-customized information is presented to the user on the end-user device as a component of a verification seal.

14. The method of claim 1, wherein the user-customized information is presented to the user on the end-user device as part of the content of the networked site.

15. A method of indicating to a user that a networked site is authentic comprising:
enabling encryption of user-customized information, the encrypted user-customized information being stored locally on an end-user device, and the user-customized information having been previously selected by a user of the end-user device;
when said end-user device accesses the networked site, receiving from said end-user device a request to verify the authenticity of the networked site together with identity information about the networked site;
verifying whether the networked site is authentic; and
when the networked site is verified as authentic, enabling decryption of the encrypted user-customized information so that the user-customized information can be presented to the user on the end-user device,
wherein enabling encryption of the user-customized information comprises:
determining at the verification server a set of encryption parameters including an encryption key; and
sending the set of encryption parameters including the encryption key to the end-user device so that the user-customized information can thereafter be encrypted on the end-user device using said encryption parameters.

16. The method of claim 15 further comprising, when said end-user device accesses the networked site, additionally receiving from said end-user device the set of encryption parameters; and wherein enabling decryption of the user-customized information comprises sending a decryption key to the end-user device to enable decryption of the user-customized information at said end-user device.

17. The method of claim 16 wherein the decryption key is sent to the end-user device over a secure channel, wherein the encryption parameters include a key identifier, and wherein the encryption key and the decryption key are purged from the end-user device once encryption and decryption have respectively been carried out.

18. The method of claim 15, wherein the encrypted user-customized information is only stored locally on the end-user device and not at the verification server.

19. A system for indicating to a user that a networked site is authentic comprising:
a verification application comprising computer-readable program code residing on an end-user device, the verification application being:
when the end-user device accesses the networked site to send, via the network, a request to verify the authenticity of the networked site together with identity information about the networked site,
to access encrypted user-customized information stored locally on the end-user device, the user-customized information having been previously selected by a user of the end-user device; and
a verification server to receive, via the network, the request to verify from the verification application and to verify whether the networked site is authentic, wherein the verification server further enables decryption of the encrypted user-customized information when a networked site is verified as authentic so that the user-customized information can be presented to the user on the end-user device,
wherein the verification server further:
receives the user-customized information together with security information from the end-user device;
determines a set of encryption parameters including an encryption key;
encrypts the user-customized information based on the encryption parameters; and
sends the encrypted user-customized information to the end-user device together with a subset of the encryption parameters, said subset not including said encryption key.

20. The system of claim 19, wherein the verification server is remote from a server of a provider of the networked site.

21. The system of claim 19, wherein, when said end-user device accesses the networked site, the verification server further:
additionally receives from said end-user device the encrypted user-customized information and the subset of encryption parameters;
decrypts the encrypted user-customized information based in part on said subset of encryption parameters; and
sends the decrypted user-customized information to the end-user device.

22. The system of claim 19, wherein, when the networked site is verified as authentic, the verification server further sends supplementary data about a provider of the networked site to the end-user device so that the supplementary data can be presented to the user on the end-user device.

23. The method of claim 19, wherein the verification server evaluates the identity information provided for the networked site, and the identity information comprises at least one script variable value in an object model of a browser used to access the networked site on the end-user device, the at least one script variable relating to at least one of the following properties of the networked site: hostname and IP address.

24. The method of claim 19, wherein the verification server evaluates the identity information provided for the networked site, and the identity information comprises hostname data gathered from a digital certificate of the networked site.

25. The system of claim 19, wherein the verification server evaluates the identity information provided for the networked site, to generate an authentication challenge for a provider of the networked site, and to evaluate a response provided by a server of the networked site in reply to the authentication challenge.

26. The system of claim 19, further comprising an editor application on the end-user device, the editor application enabling the user to select the user-customized information.

27. The system of claim 26, wherein the editor application is a component of the verification application.

28. The system of claim 19, wherein the content of the networked site includes a link invoking the verification application.

29. The system of claim 28, wherein the verification application is already resident on the end-user device when the end-user device accesses the networked site.

30. The system of claim 28, wherein the link initiates the downloading of the verification application, via the network, from a third party onto the end-user device.

31. The system of claim 30, wherein the third party is the verification server.

32. The system of claim 21, wherein the verification application is a Java applet and the link is provided as part of a JavaScript file.

33. The system of claim 19, wherein the user-customized information comprises at least one of the following: an image and an audio recording.

34. A system for indicating to a user that a networked site is authentic comprising:
  a verification application comprising computer-readable program code residing on an end-user device, the verification application being:
  when the end-user device accesses the networked site to send, via the network, a request to verify the authenticity of the networked site together with identity information about the networked site,
  to access encrypted user-customized information stored locally on the end-user device, the user-customized information having been previously selected by a user of the end-user device; and
  a verification server for receiving, via the network, the request to verify from the verification application and to verify whether the networked site is authentic, wherein the verification server further enables decryption of the encrypted user-customized information when a networked site is verified as authentic so that the user-customized information can be presented to the user on the end-user device,
  wherein:
  the verification server further determines a set of encryption parameters including an encryption key and to send the set of encryption parameters including the encryption key to the end-user device; and
  the verification application further encrypts the user-customized information based on the encryption parameters.

35. The system of claim 34, wherein when said end-user device accesses the networked site:
  the verification application sends the set of encryption parameters to the verification server, and the verification server in turn sends a corresponding decryption key the end-user device; and
  wherein the verification application further decrypts the encrypted user-customized information based on the decryption key.

36. The system of claim 35, wherein the encryption parameters include a key identifier, and wherein the verification application further purges the encryption key and the decryption key from the end-user device once encryption and decryption have respectively been carried out.

37. A method for a user of an end-user device to determine that a networked site is authentic comprising:
  communicating with a verification server to enable encryption of user-customized information based on a set of encryption parameters determined by the verification server and to store said encrypted user-customized information in a storage accessible locally to the end-user device;
  when the end-user device accesses the networked site, sending a request to verify the authenticity of the networked site together with identity information about the networked site to the verification server;
  when the networked site is verified as authentic by the verification server, communicating with the verification server to enable decryption of the encrypted user-customized information so that the user-customized information can be presented to the user on the end-user device,
  wherein communicating with the verification server to enable encryption of user-customized information comprises:
    sending to the verification server the user-customized information together with security information from the end-user device to enable the verification server to encrypt the user-customized information based on the set of encryption parameters, said set including an encryption key; and
    receiving from the verification server the encrypted user-customized information together with a subset of the encryption parameters, said subset not including said encryption key.

38. The method of claim 37, further comprising enabling the user to select the user-customized information.

39. A verification application for a user of an end-user device to determine that a networked site is authentic, the verification application comprising computer-readable program code residing on an end-user device, the verification application being to:
  communicate with a verification server to enable encryption of user-customized information based on a set of encryption parameters determined by the verification server and to store said encrypted user-customized information in a storage accessible locally to the end-user device;
  when the end-user device accesses the networked site, send a request to verify the authenticity of the networked site together with identity information about the networked site to the verification server;
  when the networked site is verified as authentic by the verification server, communicate with the verification server to enable decryption of the encrypted user-customized information so that the user-customized information can be presented to the user on the end-user device,
    wherein, in order to communicate with the verification server to enable encryption of user-customized information, the application:
    sends to the verification server the user-customized information together with security information from the end-user device to enable the verification server to encrypt the user-customized information based on the set of encryption parameters, said set including an encryption key; and receives from the verification server encrypted user-customized information together with a subset of the encryption parameters, said subset not including said encryption key.

40. The method of claim 39, wherein the verification application further enables presentation of the user-customized information on the end-user device as part of the content of the networked site.

41. A method for a user of an end-user device to determine that a networked site is authentic comprising:

communicating with a verification server to enable encryption of user-customized information based on a set of encryption parameters determined by the verification server and to store said encrypted user-customized information in a storage accessible locally to the end-user device;

when the end-user device accesses the networked site, sending a request to verify the authenticity of the networked site together with identity information about the networked site to the verification server;

when the networked site is verified as authentic by the verification server, communicating with the verification server to enable decryption of the encrypted user-customized information so that the user-customized information can be presented to the user on the end-user device, wherein communicating with the verification server to enable encryption of user-customized information comprises:

receiving from the verification server the set of encryption parameters, said set including an encryption key; and encrypting the user-customized information on the end-user device using said encryption parameters.

42. A verification application for a user of an end-user device to determine that a networked site is authentic, the verification application comprising computer-readable program code residing on an end-user device, the verification application being to:

communicate with a verification server to enable encryption of user-customized information based on a set of encryption parameters determined by the verification server and to store said encrypted user-customized information in a storage accessible locally to the end-user device;

when the end-user device accesses the networked site, send a request to verify the authenticity of the networked site together with identity information about the networked site to the verification server;

when the networked site is verified as authentic by the verification server, communicate with the verification server to enable decryption of the encrypted user-customized information so that the user-customized information can be presented to the user on the end-user device, wherein, in order to communicate with the verification server to enable encryption of user-customized information, the application:

receives from the verification server the set of encryption parameters, said set including an encryption key; and encrypts the user-customized information on the end-user device using said encryption parameters.

* * * * *